United States Patent [19]
Cole

[11] Patent Number: 4,874,061
[45] Date of Patent: Oct. 17, 1989

[54] DOWNHOLE ORBITAL SEISMIC SOURCE

[75] Inventor: Jack H. Cole, Ponca City, Okla.

[73] Assignee: Conoco Inc., Ponca City, Okla.

[21] Appl. No.: 145,019

[22] Filed: Jan. 19, 1988

[51] Int. Cl.$^4$ ............................................. G01V 1/40
[52] U.S. Cl. .................................... 181/106; 367/912
[58] Field of Search ........................... 181/102–106, 181/108–114, 116–121, 401, 402; 367/48, 49, 75, 140, 142, 143, 189, 190, 911, 912, 155, 162, 165, 168; 310/337

[56] References Cited

U.S. PATENT DOCUMENTS

| | | | |
|---|---|---|---|
| 3,309,877 | 3/1967 | Degan | 175/55 |
| 3,360,056 | 12/1967 | Bodine, Jr. | 175/55 |
| 3,578,081 | 5/1971 | Bodine | 166/249 |
| 3,718,205 | 2/1973 | Fair et al. | 181/0.5 |
| 4,310,066 | 1/1982 | Won | 181/121 |
| 4,709,362 | 11/1987 | Cole | 367/189 |

FOREIGN PATENT DOCUMENTS 672588 5/1979 U.S.S.R. ............................... 367/75

Primary Examiner—Brian S. Steinberger

[57] ABSTRACT

Apparatus for simultaneously generating elliptically polarized seismic shear waves and compression waves downhole for coupling energy through the fluid into the borehole wall. The apparatus includes an elongate frame for support in the borehole and the frame includes a drive means energizable to impart an orbital motion to at least a portion of the frame thereby to generate an orbital shear wave.

15 Claims, 4 Drawing Sheets

DOWNHOLE ORBITAL SEISMIC SOURCE

BACKGROUND OF THE INVENTION

1. Field of the Invention

The invention relates generally to downhole seismic sources and, more particularly, but not by way of limitation, it relates to an improved type of orbital vibration source for generating both shear wave and compression wave energy for coupling into a bore hole wall.

2. Description of the Prior Art

The prior art has seen a number of different downhole sources as used in different types of transmitter/receiver logging systems. Many different types of source mechanisms have been utilized for inducing acoustic energy into a borehole wall and subsequently analyzing velocity and/or phase of received energy to ascertain certain lithologic information. There are currently on-going efforts by a number of entities to develop suitable downhole sources for generation of shear waves and/or compressional waves which sources are capable of generating significantly greater power of energy input with high signal-to-noise ratios in order to enable certain new approaches to seismic data acquisition. Thus, current efforts take various forms and utilize diverse mechanisms in attempts to impart a clean, concise, seismic energy input through the borehole wall or, in some cases, the well casing, and it is contemplated that development of such sources will indeed open new possibilities of seismic data acquisition and interpretation.

SUMMARY OF THE INVENTION

The present invention relates to an improved type of downhole vibration device utilizing a reaction mass and motion generator in order to couple compressional and/or shear wave seismic energy waves into a borehole wall, and energy is generated with sufficient power and definitive wave form to enable much expanded forms of seismic energy detection. Basically, the present invention uses the sonde casing of generally cylindrical shape as the source reaction mass while housing an interactive rotational disk or the like to impart transverse orbital motion through the coupling well bore fluid into the borehole wall. The invention contemplates a number of different types of basic orbital motion generators including motor-driven eccentric disk, piezoelectric displacement, and electromagnetic displacement, as well as the various controls and safeguards.

Therefore, it is an object of the present invention to provide a downhole orbital source effective for usage in obtaining reverse vertical seismic profiles (VSP), borehole logging, cross-hole seismic sections, and related data acquisitions.

It is also an object of the present invention to provide a downhole vibrator for simultaneous production of both shear waves and compression waves with high signal-to-noise ratios.

It is yet another object of the invention to provide a downhole vibrator that can be easily operated to couple energy through the well bore fluids into the surrounding formation whether the borehole is cased or uncased.

It is yet another an object of the invention to generate elliptically polarized seismic shear waves into the wall of a fluid-filled borehole for time-displaced orbital propagation.

Finally, it is an object of the invention to provide a downhole vibrator which does not require azimuthal orientation; that is its seismic output can be the same in all radial directions.

Other objects and advantages of the invention will be evident from the following detailed description when read in conjunction with the accompanying drawings which illustrate the invention.

DETAILED DESCRIPTION OF THE INVENTION

Figure 1A:
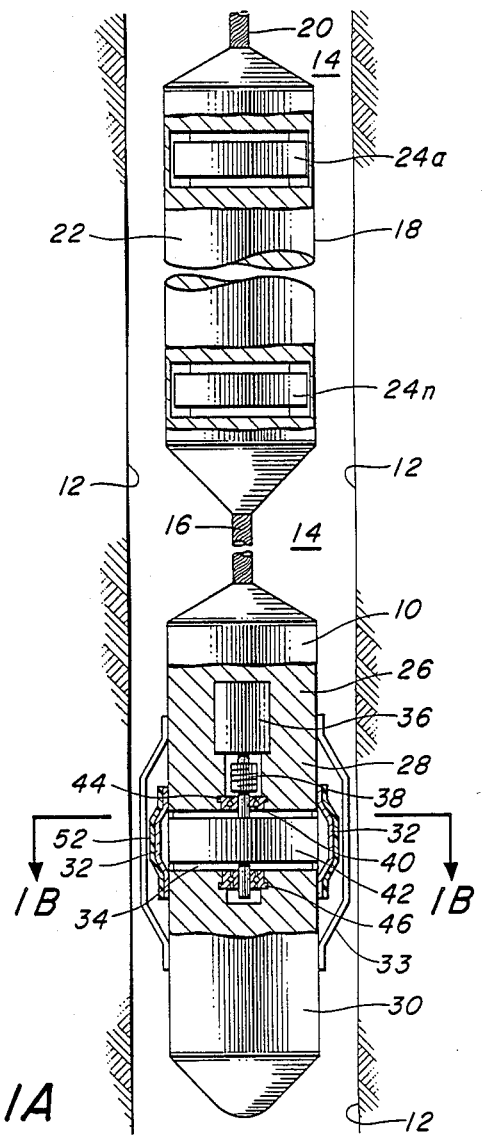
FIG. 1A is an idealized illustration of a section of borehole containing an orbital source and isolated detector sonde with section parts shown in cutaway.
Figure 1B:
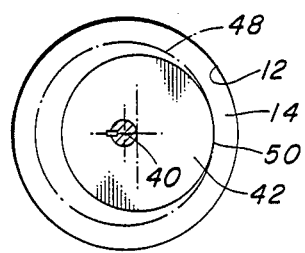
FIG. 1B is a section taken along lines 1B—1B of FIG. 1A.

FIGS. 1A and 1B illustrate one type of orbital seismic source 10 as it is suspended in a borehole 12 containing wellbore fluid 14. The source 10 is suspended by means of a cable 16 and a suitable isolator (not shown) which, damps any interactive vibration relative to a receiver sonde 18. The entire sonde string of one or more receiver sondes 18, the isolating structure, and the seismic source 10 are then supported downhole in the borehole fluid 14 by means of a surface-controlled logging cable 20.

The detector sonde 18 consists of a tubular frame 22 housing one or more vibrationally isolated seismic energy detectors 24a-24n which are mounted in energy coupling relationship to the borehole fluid 14. Various detector schemes may be utilized depending upon the information sought from the borehole generated energy. In other applications, the receiver sonde 18 may be eliminated and the source 10 positioned downhole for generation of compression waves and orbital shear waves whereupon a surface detector array aligned for selected vertical seismic profiling (VSP) is utilized. In still other applications, the receiver sonde 18 may be eliminated with the source 10 positioned downhole for generation of seismic shear and compression waves whereupon seismic energy detectors are positioned in one or more separate boreholes in the vicinity of borehole 12 for crosshole seismic imaging activities.

The source 10 consists of a frame 26 formed to contain considerable mass in upper section 28 and lower section 30. The frame 26 constitutes the isolation mass for the source reaction and the upper and lower frame mass members 28 and 30 are maintained in rigid alignment by means of structural cages 32 and 33. Inner structural cage 32 may be formed as a plurality of circumferentially arrayed interconnecting bars secured to define a cylindrical chamber 34 between mass members 28 and 30.

An A-C or D-C motor 36 with a built-in feedback encoder is secured within upper frame mass member 28 to provide rotational drive axially through a flexible coupling 38 into a drive shaft 40. Drive shaft 40 has an eccentric disk 42 secured thereon for rotation as shaft 40 rotates within upper and lower bearing members 44 and 46. The disk 42 is eccentrically mounted on the drive shaft 40, as shown also in FIG. 1B, but it is dynamically balanced relative to drive shaft 40 to provide vibration-free rotation if rotated in air. Thus, and referring to FIG. 1B, rotation of eccentric disk 42 sweeps out a circular path defined by dash-line 48 which results in a circular motion of fluid pressure increase at the largest radius point 50 of eccentric disk 42. Thus, the eccentric disk 42 rotates and sweeps out an envelope 48 in orbital manner about the motor shaft 40 center line or axis as a pressure increase is seen at the position of radius point 50 while a presssure decrease is seen 180° around disk 42.

The inner structural cage consisting of bar members 32 rigidly connects the upper and lower reaction mass frames 28 and 30, and a sleeve of elastomer membrane 52 is circumferentially secured to cover the outside of structural cage and enclose the void 34 which is filled with a highly filtered, low viscosity oil. A pressure compensation system, not shown, automatically equalizes pressure across the membrane as the sonde traverses vertically within the borehole. The elastomer membrane 52 may be tightly secured by means of suitable ring clamps or the like in sealed manner about upper and lower frame mass members 28 and 30. The outer structural cage consisting of bar members 33 prevents elastomer membrane 52 from contacting the borehole sidewall and further rigidly connects the upper and lower reaction mass frames 28 and 30. Optional state-of-the-art borehole centralizers, not shown, may be used to keep the source and/or receiver sondes centered within the borehole and to prevent sonde rotatation during operation.

As the eccentric disk 42 rotates, the maximum radius point 50 forces oil outward against the membrane 52 thereby to place a localized pressure increase on the interior of the membrane 52. Simultaneously, pressure is reduced in an area 180° displaced as the disk 42 moves to a maximum away from that area. The exterior of the membrane 52 will then displace outward in the area nearest the maximum radius point 50 of disk 42 with simultaneous displacement inward on the opposite side of disk 42. Thus, the exterior of the membrane 52 serves as a rotating dipole shear wave disturbance which is coupled through the borehole fluid into the borehole wall 12 in orbiting manner.

Figure 2:
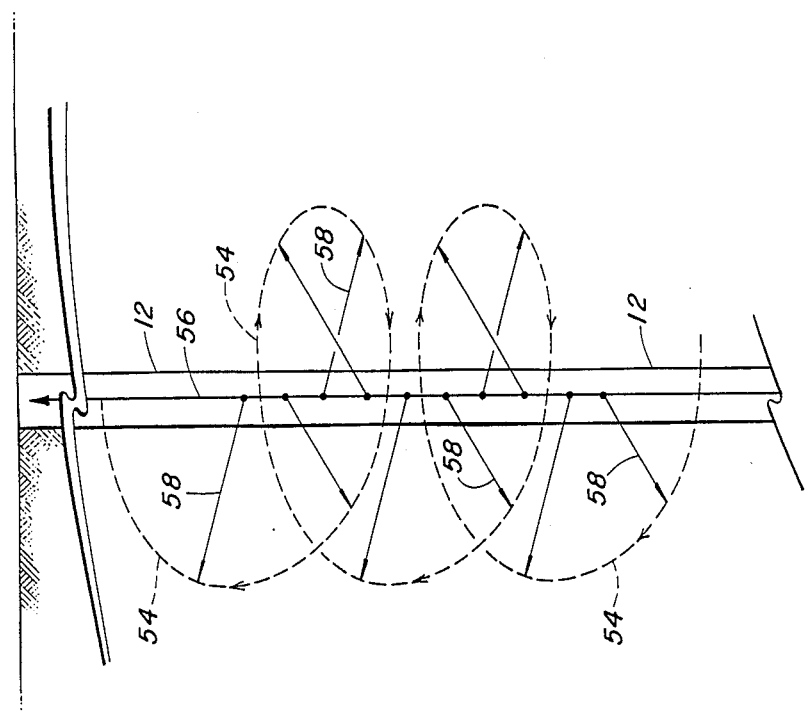
FIG. 2 is a depiction of energy propagation from an orbital source, uphole toward earth's surface.

FIG. 2 illustrates in idealized form the manner in which orbital shear wave energy may propagate upward along a borehole from a selected downhole position. Thus, an orbital shear wave as continuously generated at some point down borehole 12 will propagate upward as an elliptically polarized shear wave along the rotational or helical propagation path 54. Thus, energy is propagated along a ray path 56 or the axis of borehole 12. As the particle motion propagates with earth particle movement continually in a plane perpendicular toray path 56, the representative vector 58 of particle motion rotates thereabout. The displacement vector 58 sweeps out a helix as it progresses upward and the vector may vary between minor and major axes, depending upon the elliptical function of the generation scheme. In most cases of rotational disk source, the elliptical polarization of the shear wave will assume the circular or special case. Handedness of the helix can easily be reversed by reversing the direction of source rotation. Disclosure of such elliptically polarized shear waves is the particular subject matter of co-pending U.S. patent application Ser. No. 897,448 entitled "Method of Seismic Exploration Using Elliptically Polarized Shear Waves". While FIG. 2 illustrates an upward helical propagation path, it should be realized that a downward helical propagation path will also exist and from the center of the source such path will be a mirror image of that illustrated by FIG. 2.

FIG. 2 illustrates only the propagation form about a ray path coaxial with the borehole. If the orbital input from the source is circular, propagation about any ray path inclined from the borehole axis will be along an elliptical helix with the minor axis of the ellipse shrinking to zero as the ray path reaches the plane normal to the borehole axis. That is, only plane polarized shear waves will be generated in a plane passing through the center of the source and normal to the borehole axis.

It should be emphasized that the orbital downhole source is also effective in generating seismic compression waves. It is well known that a horizontal dipole source produces compression waves in two lobes symmetrical about the horizontal axis along which the source motion occurs. As was previously mentioned, the orbital downhole source is in effect a rotating dipole; hence it will produce compression waves in all radial directions about the borehole vertical axis. Such waves are produced by the direct action of rotating pressure against the side wall of the borehole. Furthermore, experimental evidence indicates that the shearing action simultaneously generates compression waves centered about all ray paths inclined 45° with respect to the centerline of the borehole. Thus, the downhole orbital vibrator is an effective universal downhole source.

Figure 3A:
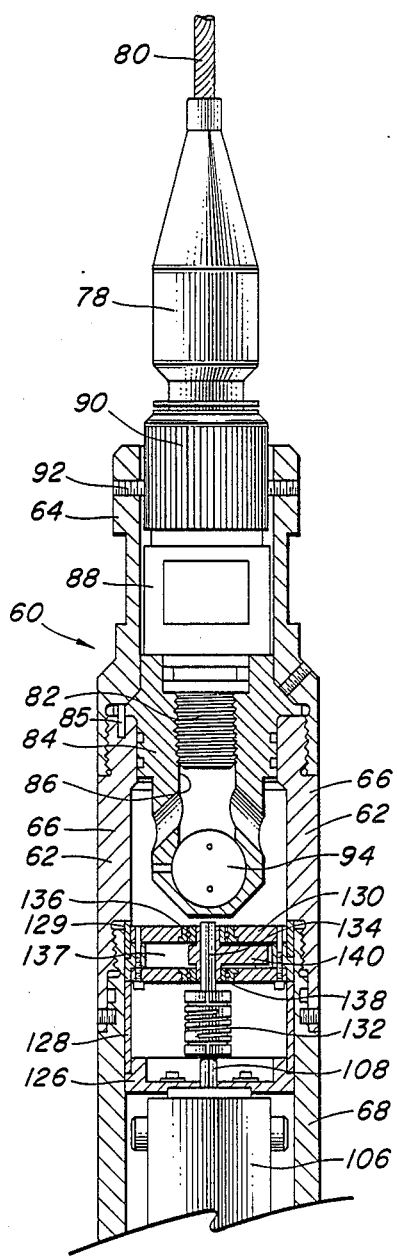
FIG. 3A is a vertical cross-section of the upper portion of another form of orbital seismic source.
Figure 3B:
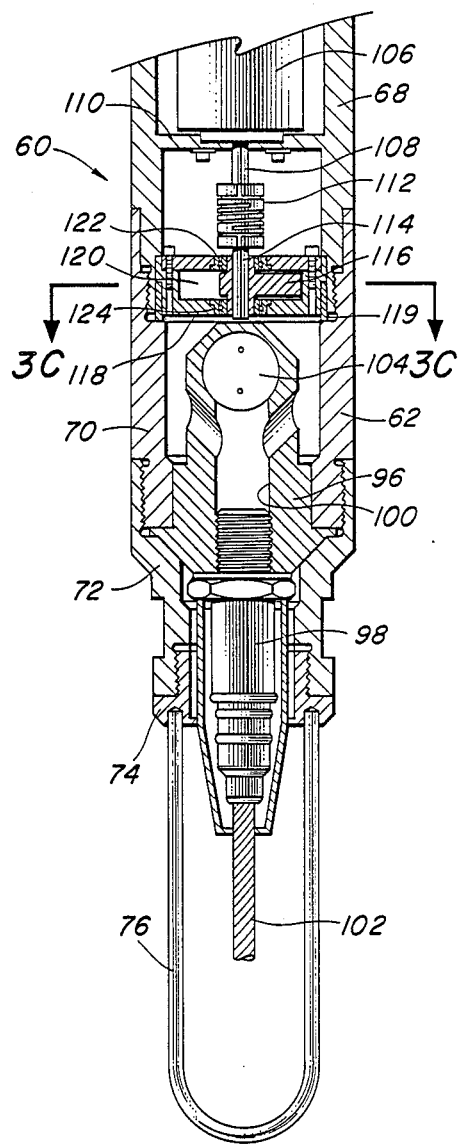
FIG. 3B is a vertical cross-section of the lower portion of the orbital seismic source of FIG. 3A.
Figure 3C:
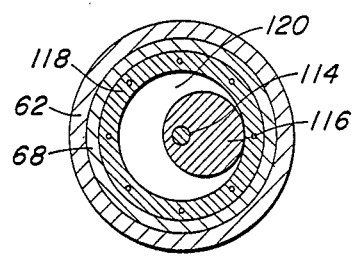
FIG. 3C is a cross-section taken along lines 3C—3C of FIG. 3B.

FIGS. 3A-3C illustrate an alternative form of orbital shear wave vibrator which utilizes the concept of rotation of an unbalanced mass within a reaction mass with seismic energy generation in response to orbital movement of the reaction mass outer wall. In this case, an orbital shear wave vibrator 60 includes a tubular housing 62 which also forms the reaction mass, which in this application is of as low a value as is practical. The tubular housing 62 is formed of sections consisting of a crown sleeve 64 that is threadedly secured in sealed relationship to an upper sleeve 66 which, in turn, is threadedly connected in sealed relationship to a middle sleeve 68. The middle sleeve 68 is also then threadedly received within a bottom sleeve 70 (FIG. 3B) which is threadedly engaged with a bottom cap sleeve 72 and cap 74 which extends a descending bail 76.

A connector collar 78 having a multiple-conductor logging cable 80 is connected into source 60 in a sealed relationship through mating connector 88 by means of a threaded post 82 which is an intergral part of connector 88. A mass body of revolution 84 is adapted to be seized upon threaded affixure of collar sleeve 64 to upper sleeve 66 while defining a threaded radial bore 86 for receiving the threaded post 82. Threaded post 82 extends through connector 88 forming a sealed compartment into secure threaded engagement with threaded collar 90 secured by set screws 92 within the upper portion of collar sleeve 64. Thus, the mass body 84 not only provides a rigid connection to the upper cable assembly, but also it provides support structure for at least one geophone 94 which, through selective rotation of mass body 84, is maintained in a selected transverse alignment. Dowell pin 85 prevents rotation of body 84 with respect to upper sleeve 66.

The lower portion of source 60 is similarly constructed as a mass body 96 is secured upon threaded assembly of cap sleeve 72 and lower sleeve 70. A cable connector 98 is threadedly received within a threaded bore 100 of mass body 96 to provide electrical connection through to the lower cable 102. A lower cable assembly 102 may be used in certain configurations but not all, and a suitable plug member would be utilized otherwise. Bail 76 is available for suspension of selected stabilizing weights. The mass body 96 also retains at least one geophone in designated azimuthal direction for use as will be further described below. Orientation is maintained by an index pin not shown.

The middle sleeve 68 is adapted to contain a variable speed A-C or D-C electric motor 106 having a double ended shaft 108 to provide rotational drive power to the eccentric rotors. Motor 106 contains a built-in encoder, not shown, to provide feedback for use in speed and phase control. The underside of motor 106 (FIG. 3B) is rigidly secured to a transverse annular flange 110 as rotary shaft 108 is secured to a flexible coupling 112 having an output shaft 114 that is secured to an eccentric rotor 116. A circular housing member 118 is suitably secured at the juncture of middle sleeve 68 and lower sleeve 62 by spacer 119 to define a cylindrical cavity 120. A pair of axially aligned bearings 122 and 124 secured in housing 118 provide rotational support to the eccentric rotor 116. As shown in FIG. 3C, the eccentric rotor 116 is a circular disk with off-center drive point as at shaft 114. Other forms of eccentric mass rotors could obviously be used. The form shown is a compromise to provide high mass eccentricity and reduced air drag.

A similar structure is employed at the upper end (FIG. 3A) as motor 106 is secured to annular flange 126. A cylindrical spacer 128 is secured in support beneath a suitable cylindrical housing 130 which is further secured by spacer 129 at the threaded juncture of upper sleeve 66 and middle sleeve 68. The upper end of rotary shaft 108 is connected through a flexible coupling 132 which provides output on shaft 134 that is secured to an eccentric rotor 140. Rotor 140 is retained within upper and lower axial bearings 136, 138. The housing 130 defines a cylindrical void 137 and an eccentric disk 140 is keyed on shaft 134 to rotate therein. The eccentric disks 140 and 116 are key connected to respective shafts 134 and 114 in like phase or radial alignment.

In operation, the orbital shear wave source 60 is suspended in a fluid-filled borehole (not shown) at a designated position and the outer cylindrical walls of frame housing 62 are in energy-coupled relationship to the borehole wall. In-phase rotation of the eccentric disks 140 and 116 by the motor 106 bring about a reactive orbital motion of the frame housing mass 62 which results in an orbital shear wave being coupled into the borehole wall for propagation outward and upward in the manner as shown in FIG. 2. Compression seismic waves, as previously described, are also generated. Two geophones 94 and 104 are mounted in identical orientation proximate opposite ends of the frame housing 62, and these provide output control signals for use variously in monitoring the source output signal, indexing rotation of the source, detection of replica signals, etc. Additional pairs of geophones such as a pair orientated 90° with respect to geophones 94 and 104 can easily be added.

Figure 4A:
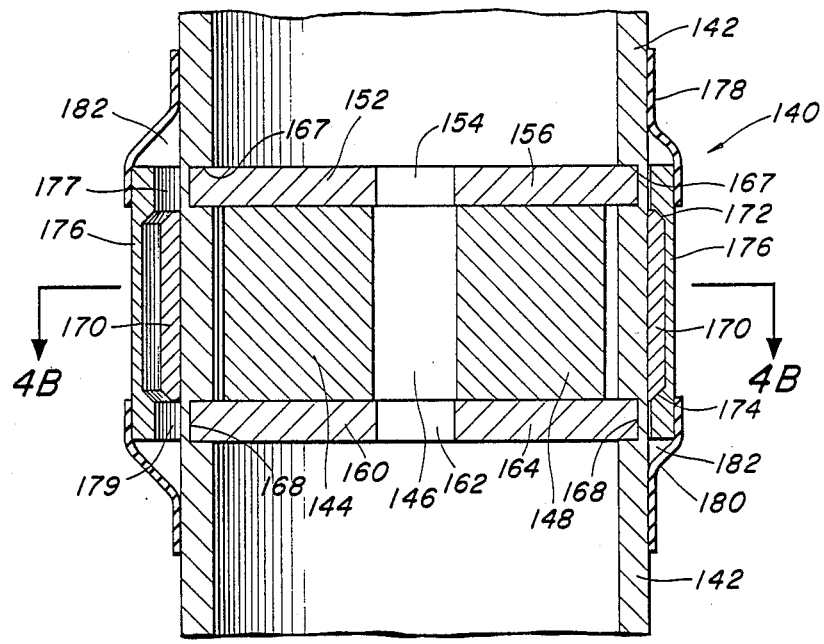
FIG. 4A is a vertical cross-section of a portion of a downhole source wherein prime force generation is effected by electromagnetics.
Figure 4B:
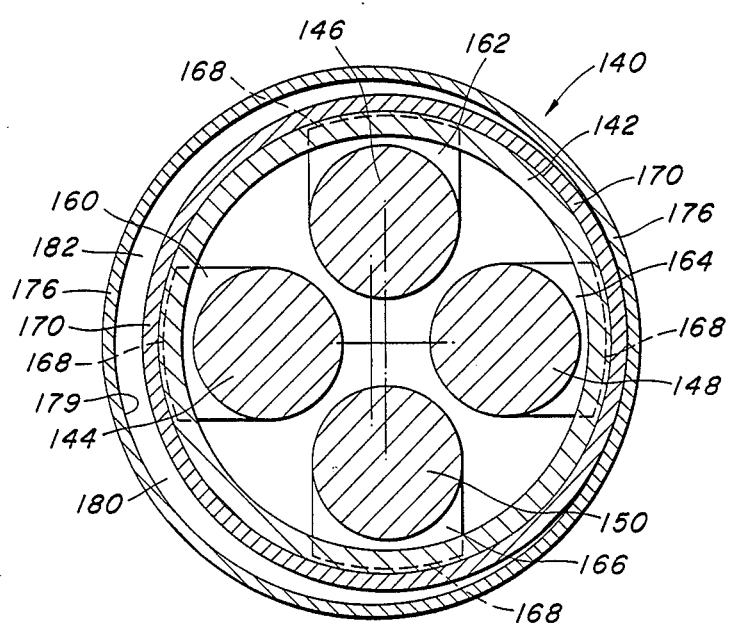
FIG. 4B is a section taken along lines 4B—4B of FIG. 4A.

FIGS. 4A and 4B illustrate an alternative form of source power generation of the low inertia type, i.e., similar to that disclosed in FIG. 1A wherein the rotor is balanced but energy coupling movement is imparted through an orbiting diaphragm motion. An orbital shear wave source 140 includes a cylindrical frame portion 142 having a quadrature array of wire coils disposed near the periphery. A plurality of wire coils 144, 146, 148 and 150 are wound of selected gauge wire on high magnetic permeability cores to provide desired electromagnetic qualities. The frame housing 142 is formed of non-magnetic metal and the upper pole pieces 152, 154, 156, and 158 and lower pole pieces 160, 162, 164, and 166 are formed of high magnetic permeability material. Thus, each of the pole pieces is secured through the inner wall of frame housing 42 in suitable arcuate grooves 167 and 168 to support the respective wire coils 144–150 adjacent the inner wall of frame housing 142.

A non-magnetic stainless steel ring 170 having upper and lower beveled edges 172, 174 is suitably secured around frame housing 142 and extending between the upper and lower iron pole pieces 152–158 and 160–166. A reaction ring 176 having inside diameter race surfaces 177 and 179 slightly larger than the outside diameter of the stainless steel ring 170 is then disposed to overlay the stainless steel ring 170 in spaced relationship. The iron ring 176 may be formed with heavier upper and lower races 177 and 179 to assure magnetic alignment with the respective upper and lower pole pieces. An elastomer upper sleeve 178 is suitably secured to seal between frame housing 142 and the upper portion of iron ring 176 as a lower elastomer sleeve 180 is similarly secured to seal adjacent the lower edge of iron ring 176. A cavity 182 formed within the elastomer barriers is then filled with a suitable low viscosity oil to provide pressure balance across the elastomer barriers and to ensure smooth contact and reduction of noise and interference.

In operation, a plurality of phase displaced alternating current sources are connected downhole to selected ones of the respective electromagnetic coils 144–150 and, in accordance with the energizing voltage phase relationship, energization of the respective electromagnetic coils takes place in a predetermined sequence progressing around the frame housing 142. Thus, as iron ring 176 is attracted inward adjacent stainless steel ring 170 on one side, the opposite side is maximum outward to provide a localized increase in pressure in the borehole fluid which, in turn, imparts shear wave particle energy to the borehole wall at that point. Depending upon the phase relationship of the energizing voltages, the iron ring 176 can be orbitally rotated variously around the frame housing to generate an elliptically polarized shear wave in the borehole wall.

Figure 5:
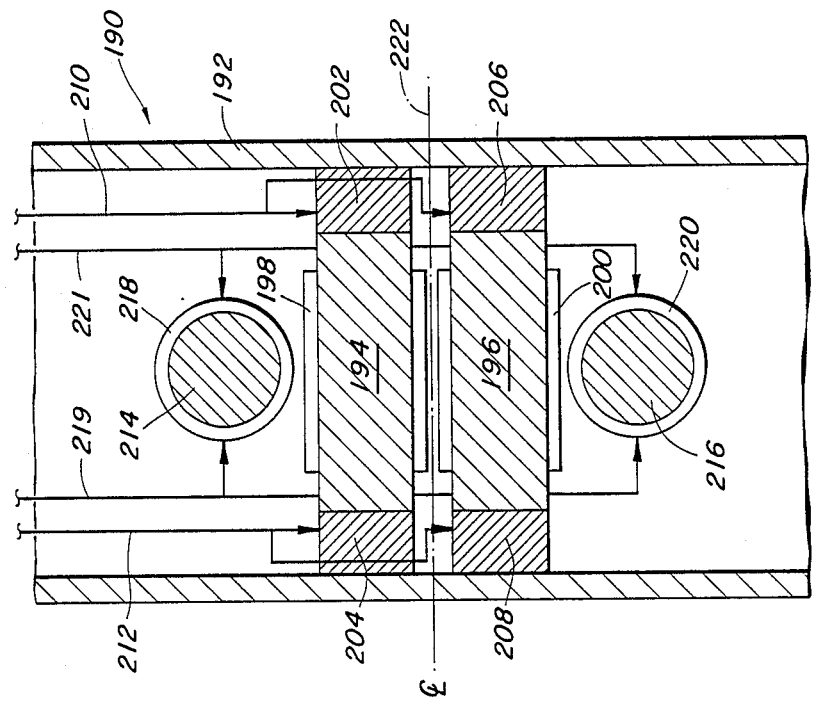
FIG. 5 is a vertical section taken along a portion of a downhole seismic source wherein the prime energizing force relies upon piezoelectric action.

FIG. 5 illustrates yet another form of low inertia orbital shear wave source for downhole application wherein piezoelectric elements are used. A downhole shear wave source 190 includes a suitable tubular frame housing 192 and a plurality of directionally displaced piezoelectric elements secured centrally therealong. Thus, central most, a pair of reaction masses 194 and 196 are disposed in juxtaposition and in parallel as supported transversly in frame housing 192 by means of respective low friction linear bearings 198 and 200. The linear bearings of selected diameter and length are available from such as Linear Rotary Bearings, Inc. of Westbury, N.Y. The piezoelectric elements 202 and 204 are suitably bonded on the ends of reaction mass 194, and piezoelectric elements 206 and 208 are similarly bonded on the ends of reaction mass 196. The outer ends of piezoelectric elements 202–208 are suitably bonded in rigid contact with tubular frame housing 192. The electrical connections 210 and 212 then control the alternating piezoelectric energizations. A pair of reaction masses 214 and 216 are then disposed above and below masses 194 and 196 in equi-spaced position but disposed at right angles. Each of masses 214 and 216 is suspended by a low friction linear bearing 218 and 220 and each of these includes opposite end piezoelectric elements assembled in the same manner as reaction masses 194 and 196. The electrical control connections 219 and 221 apply alternating energization to the piezoelectric elements.

The source 190 is another alternative form of low inertia seismic source capable of relatively good power output. The transverse reaction masses and energizing elements are arranged in pairs so that they can be equally disposed on each side of the frame housing center line 222 thereby to provide balanced transverse force on frame housing 192 and to avoid any torquing motion to the longitudinal axis. While four elements are shown, additional quadratures of such elements could easily be added equally disposed on each side of housing centerline 222, to provide increased power output capability. Thus, application of an energizing voltage on lead 212 with opposite pulsing on lead 210 results in crystal elongation of piezoelectric elements 204 and 208 with attendant contraction of elements 202 and 206 thereby to generate localized increased pressure at the borehole wall adjacent piezoelectric elements 204 and 208. Similar control of the transverse reaction masses 214 and 216 by alternate pulsing of their respective piezoelectric elements, results in similar shear wave forces at the borehole wall. Thus, coordinated control in selected phase relationships of the two 90° displaced pairs of reaction masses is effective to generate an elliptical or circularly polarized shear wave in the adjacent borehole wall. This type of phase adjusted electronic control is more clearly discussed in the aforementioned U.S. patent application Ser. No. 897,448 entitled "Method of Seismic Exploration Using Elliptically Polarized Shear Waves".

The foregoing discloses a novel form of downhole orbital seismic vibrator of the type wherein seismic shear waves, particularly elliptically polarized seismic shear waves, can be coupled through the borehole fluid into the borehole wall with appreciable power while simultaneously generating seismic compression waves of appreciable power. Generation of such shear waves and compression waves downhole enables a number of new sounding techniques wherein data can be compiled in the form of reverse vertical seismic profiles, (VSP) or seismic profiles can be established from hole to hole across a selected terrain. In addition, such vibrators may still be useful for acoustic sounding along a single borehole for the purpose of establishing velocity relationships of the various stratum.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. A downhole seismic source for the simultaneous generation of elliptically polarized shear wave seismic energy and compression wave seismic energy into a fluid-filled borehole wall comprising:
   an elongated cylindrical frame means immersible in said fluid-filled borehole, said frame means having a central axis and first and second ends and an outer wall supportable at a point along said borehole wall;
   means including a cable connected to said cylindrical frame means first end for supporting the frame means at selected positions along said borehole; and
   drive means disposed in said frame means in approximately equal spacing from the first and second ends and energizable to impart an eccentric orbital motion to at least a circumferal portion of the frame means outer wall thereby to generate an elliptically polarized shear wave in said borehole wall.

2. A downhole seismic source as set forth in claim 1 wherein said cylindrical frame means comprises:
   a cylinder having continuous outer wall in contact with the borehole fluid; and
   top and bottom end cap structure secured to opposite ends of the cylinder.

3. A downhole seismic source as set forth in claim 2 wherein said drive means comprises:
   a drive motor providing rotational output; and
   first and second eccentric rotors receiving said rotational output, said rotors being equispaced along the central axis of said frame means and aligned in parallel and radial alignment for synchronous eccentric rotation.

4. A downhole seismic source as set forth in claim 2 wherein said drive means comprises:
   at least two equal first reaction masses having opposite ends and being secured in parallel juxtaposition and transverse alignment centrally in said frame means;
   at least two equal second reaction masses having opposite ends and being secured in said frame means with one on each side of said first reaction masses but in right angle transverse alignment relative to the first masses;
   a plurality of piezoelectric elements each bonded in affixure on respective ends of said first and second reaction masses and to the frame means cylinder; and
   means for energizing said piezoelectric elements in selected phase relationship to exert predetermined rotational transverse thrust to said cylindrical frame means.

5. A downhole seismic source as set forth in claim 4 which further includes:
   at least four linear bearings secured to support said first and second reaction masses.

6. A downhole seismic source as set forth in claim 2 wherein said drive means comprises:
   at least four electromagnetic coils having upper and lower pole pieces of metal having high magnetic permeability, said coils being held in quadrature array with the upper and lower pole pieces each being circularly aligned and with all pole pieces being secured within the mass of said cylinder;

a non-magnetic ring of selected outer diameter bonded around said cylinder in the circular area between the circularly arrayed pole pieces;

an iron ring of selected inside diameter greater than said non-magnetic ring outer diameter and disposed concentrically thereto;

fluid-tight pliable boot means secured to said cylinder means on each side of said non-magnetic ring to retain said iron ring in concentricity;

fluid of selected viscosity and compressibility disposed within said boot means; and means for energizing said electromagnetic coils in selected quadrature phase relationship to displace said soft iron ring in rotational transverse thrust relative to said cylindrical frame means.

7. A downhole seismic source as set forth in claim 1 wherein said drive means comprises:

a drive motor providing rotational output; and first and second eccentric rotors receiving said rotational output, said rotors being equispaced along the central axis of said frame means and aligned in parallel and radial alignment for synchronous eccentric rotation.

8. A downhole seismic source as set forth in claim 7 wherein said first and second eccentric rotors each comprises:

a circular disk having an eccentrically displaced shaft hole for receiving input of rotation.

9. A downhole seismic source as set forth in claim 7 wherein:

said drive motor is a variable speed electric motor which includes a feedback encoder.

10. A downhole seismic source as set forth in claim 1 wherein said cylindrical frame means comprises:

at least two cylindrical frames secured in axial alignment by a largely open peripheral structural cage and defining a cylindrical cavity therebetween;

a pliable boot enclosing said cylindrical cavity and retaining fluid therein; and first and second end cap means secured to opposite first and second ends of the secured cylindrical frames.

11. A downhole seismic source as set forth in claim 10 wherein said drive means comprises:

a drive motor providing rotational output along said central axis; and a rotor disk having selected thickness and being driven eccentrically by said rotational output, said disk being disposed in said cavity to distend said boot in orbital manner relative to the borehole wall.

12. A downhole seismic source as set forth in claim 11 wherein:

said drive motor is a variable speed electric motor with at least on built-in feedback encoder.

13. A downhole seismic source as set forth in claim 10 wherein said structural cage comprises:

at least two peripherally disposed equi-spaced struts secured longitudinally between the respective frames.

14. A downhole seismic source as set forth in claim 13 wherein said pliable boot comprises:

a generally cylindrical elastomer membrane sealingly secured about the periphery of respective frames adjacent said cylindrical cavity.

15. A downhole seismic source as set forth in claim 10 wherein said pliable boot comprises:

a generally cylindrical elastomer membrane sealingly secured about the periphery of respective frames adjacent said cylindrical cavity.

* * * * *